United States Patent [19]

Grant et al.

[11] Patent Number: 5,119,225
[45] Date of Patent: Jun. 2, 1992

[54] MULTIPLE ACCESS COMMUNICATION SYSTEM

[75] Inventors: Michael A. Grant; David Robson, both of Stevenage, United Kingdom; Nicholas F. Matthews, Plainboro, N.J.

[73] Assignee: British Aerospace Public Limited Company, London, England

[21] Appl. No.: 298,543

[22] Filed: Jan. 18, 1989

[30] Foreign Application Priority Data

Jan. 18, 1988 [GB] United Kingdom ............... 8801008

[51] Int. Cl.[5] .................. H04B 10/00; B64G 1/00
[52] U.S. Cl. .................. 359/172; 359/164; 244/158 R; 342/354; 455/12.1
[58] Field of Search ............. 455/607, 617, 606, 603, 455/12, 51, 62; 342/352, 354, 355, 357, 356, 358; 356/152; 250/206.2; 244/158 R, 161, 171

[56] References Cited

U.S. PATENT DOCUMENTS

| | | | |
|---|---|---|---|
| 3,504,182 | 3/1970 | Pizzurro et al. | 250/199 |
| 3,641,347 | 2/1972 | Kubo et al. | 250/206.2 |
| 4,375,697 | 3/1983 | Visher | 342/356 |
| 4,618,111 | 10/1986 | Sherwood et al. | 244/158 R |

FOREIGN PATENT DOCUMENTS 2127643  4/1984  United Kingdom ............... 455/617

OTHER PUBLICATIONS

Auer, W., "Pointing, Acquisition and Tracking for Intersatellite Optical Data Links," May, 1984.
Proccedings SPIE, Optical Systems for Space Applications, The Hague, 30th Mar.—1st Apr. 1987, pp. 232-238, SPIE-The International Society of Optical Engineers, Washington, US; R. Halm et al.: "Transceiver in-flight checkout system".
Proceedings SPIE, Optical Systems for Space Applications, The Hague, 30th Mar.-1st Apr. 1987, pp. 239-244, SPIE-The International Society for Optical Engineering, Washington,, US; A. F. Popescu et al.: "Laboratory Model of A Bidirectional Diode Laser Data Link with Acquisition and Tracking Capability".

Primary Examiner—Curtis Kuntz
Assistant Examiner—Kinfe-Michael Negash
Attorney, Agent, or Firm—Nixon & Vanderhye

[57] ABSTRACT

A multiple access communications system comprises a node spacecraft GEO and several user spacecraft $LEO_1$ to $LEO_n$. Each user spacecraft $LEO_1$ to $LEO_n$ includes a transmit/receive terminal head $18_1$ to $18_n$, and the node spacecraft GEO includes n transmit/terminals 22 to $22_n$ and a single beacon unit 24. The beacon beam may be operated to initiate acquisition phases which allow two-way communication to be established between the transmit/receive terminals $22_1$ to $22_n$ on the node spacecraft and the transmit/receive terminals $18_1$ to $18_n$ on the corresponding user terminals. The acquisition phases include a period during which the beacon scans an uncertainty cone associated with the node spacecraft. This scanning period is reduced for second and subseqeunt acquisitions by using the first and subsequently acquired communication links to provide a more accurate estimate of the angular attitude of the node spacecraft, thus reducing the extent of the uncertainty cone.

11 Claims, 6 Drawing Sheets

MULTIPLE ACCESS COMMUNICATION SYSTEM

This invention relates to a multiple access communication system in which a "node" communication station may communicate with two or more "user" communication stations. In particular, but not exclusively, the invention relates to multiple access optical communication systems for use on a spacecraft. The invention may extend to very high frequency radio systems. In addition the system may provide communications between other communication stations such as aircraft.

There is considerable interest in providing an optical communication system to allow large amounts of data to be transmitted between spacecraft. In many applications data needs to be transmitted simultaneously from one spacecraft (perhaps in geostationary orbit) to a plurality of other spacecraft (perhaps in a plurality of low earth orbits). Similarly it may be required to transmit data from several low earth orbit spacecraft simultaneously to a single geostationary orbit spacecraft. Examples of such systems include those for gathering weather data or earth resource data. In addition, of course it is commonly desired to transmit data between two geostationary orbit spacecraft.

There is thus a need for a communications system which allows simultaneous communication between a node spacecraft and several user spacecraft. Where communication is via an optical beam it is important to point the communications beam accurately along the line of sight connecting the node spacecraft and the relevant user spacecraft because the beam width of the optical communications beam is very narrow. This precise pointing requirement means that the node spacecraft and the user spacecraft must each have accurately pointable transmit/receive terminals together with some means which allows the node and user spacecraft to acquire and track each other.

It has been proposed to provide an optical communications system which allows two-way data exchange between one spacecraft carrying an appropriate set of communication apparatus to one, and only one, spacecraft carrying a matching set of apparatus. Briefly each set of apparatus on the node spacecraft includes a pointable transmit/receive terminal which incorporates an acquisition beacon, acquisition and tracking sensors, transmit/receive equipment including associated multiplexing and demultiplexing devices and a terminal control. If simultaneous optical communication is required with more than one user spacecraft then the node spacecraft needs to carry one set of communications apparatus for each user spacecraft. However, this arrangement will have a heavy weight penalty. The Applicants have designed a system which will allow simultaneous optical communication between a node spacecraft and several user spacecraft in which the communications equipment is of reduced weight compared to the above proposal.

According to one aspect of this invention there is provided a communication system, comprising a plurality of user stations each having a transmit/receive terminal, a node station having a plurality of transmit/receive terminals associated with respective ones of said user stations, and beacon beam means provided at said node station for initiating respective acquisition phases for linking respective ones of said transmit/receive terminals on said node station with the transmit/receive terminal on the corresponding user station, and means for providing a rigid reference at said node station for the associated transmit/receive terminals and said beacon beam means.

Another factor encountered in optical communications systems is the acquisition time taken for the node spacecraft and a user spacecraft to establish communication. The acquisition time (in conventional systems about 1½ to 2 minutes) represents "lost" communications time and is particularly significant in communications between a geostationary orbit spacecraft and a low earth orbit spacecraft where the low earth orbit spacecraft may be in the field of view of the geostationary orbit spacecraft for only an hour or so for each orbit. It is thus highly desirable to minimise the acquisition time. A large proportion of the acquisition time is spent in scanning a beacon on the node spacecraft through an uncertainty cone within which the user spacecraft is expected to lie. The uncertainty cone exists because, although it is possible to locate the relative positions of the spacecraft with sufficient accuracy, the angular attitude of the node spacecraft cannot usually be maintained better than about 0.2° in roll pitch and yaw. Thus, even though the theoretical line of sight connecting the node spacecraft and the user spacecraft can be determined with high accuracy the beacon must perform a scan pattern around this line of sight, with the extent or magnitude of maximum angular deviation from the line of sight being determined by the magnitude of the node spacecraft's attitude uncertainty. In our earlier European Patent Application No. 88311009.0, the contents of which are incorporated herein by reference, we disclosed a modified scanning method by which the scanning pattern of the beacon and that of the acquisition sensor on the node spacecraft may be performed to reduce the acquisition time to about 30 seconds. We have found that the acquisition time may be reduced further in a multi-user system by using the first "fix" obtained when the first user is acquired to refine or reduce the attitude uncertainty of the node spacecraft so that when acquiring the second user spacecraft, the extent of this scan pattern may be reduced so reducing the acquisition time for the second user spacecraft. By using the second "fix" the attitude uncertainty can be further refined so that for third and subsequent acquisitions a further reduced scan pattern can be used, with a consequent reduction in time. It is believed that if two attitude fixes are obtained within a short time frame the scan pattern may be optimised and thus there will not normally be a further reduction in acquisition time for fourth and subsequent acquisitions. It should be noted that the acquisition time reduction method may be used either in conjunction with the reduction method described in our earlier European Patent Application No. 88311009.0 or separately.

According to another aspect of the invention, there is provided, in a system including a node station and at least two user stations, wherein the relative positions of the node station and user stations may be determined and wherein the angular attitude of the node stations relative to a reference frame may be estimated subject to an uncertainty factor, a method of establishing communications between said node station and each of said user stations, which comprises causing an acquisition beam associated with said node station to follow a first scan pattern about an axis connecting it to a selected one user station, the pattern being of extent dependent on said uncertainty factor, causing said one user station to transmit a beam back to said node station whereby the estimate of the angular attitude of the node station may be refined, and thereafter causing said acquisition beam to follow a second scan mode about an axis connecting said node station with another of said user stations, the pattern being of correspondingly reduced extent.

The invention will now be described by way of example only, reference being made to the accompanying drawings, in which.

Figure 1:
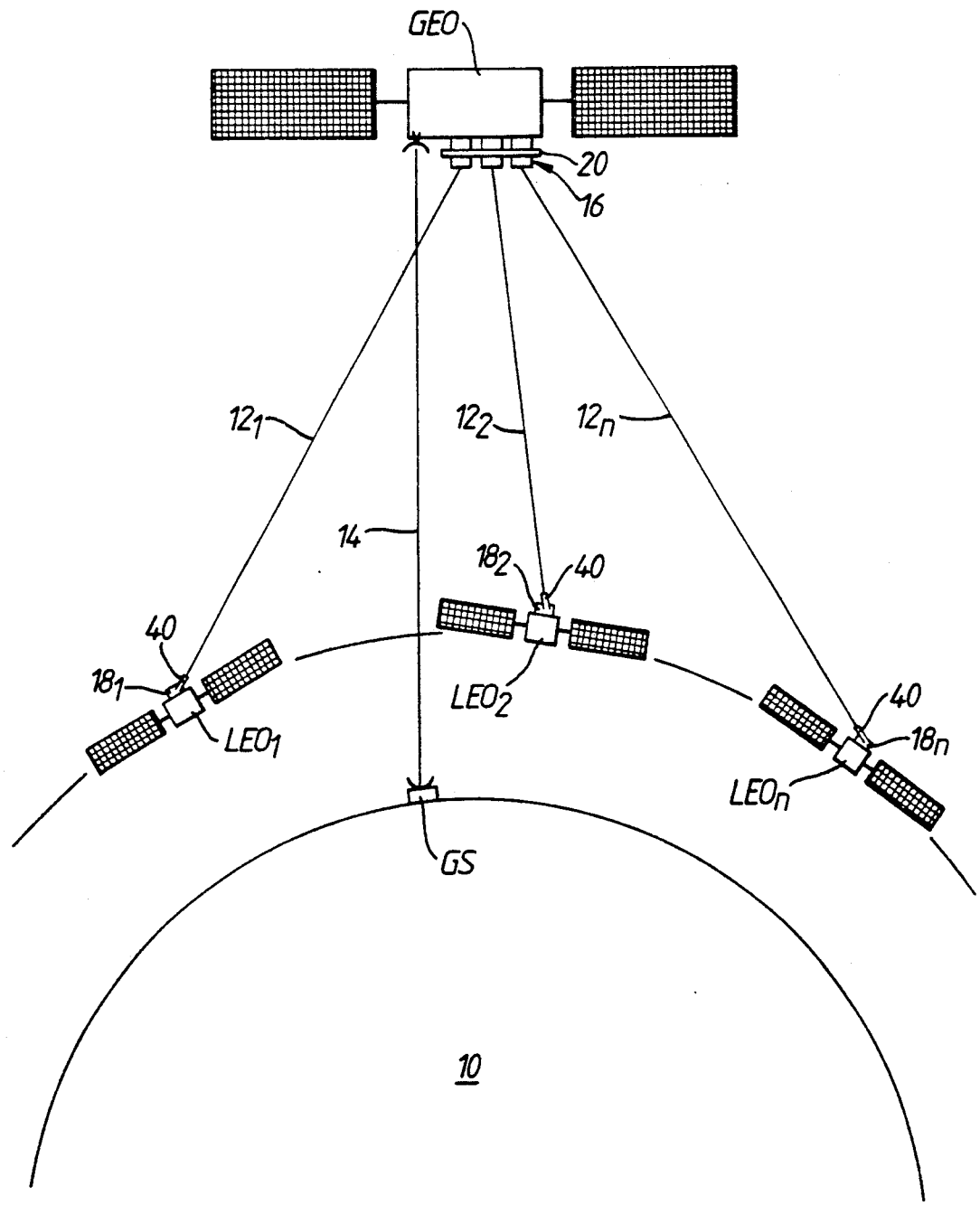
FIG. 1 is a schematic view showing a node spacecraft in geostationary orbit and a plurality of user spacecraft in low earth orbit.

Referring to FIG. 1 there is shown a node spacecraft GEO in geostationary orbit above the earth 10 with low earth orbit user spacecraft $LEO_1$ to $LEO_n$, and it is desired to provide simultaneous optical communication between the node spacecraft GEO and two or more of the user spacecraft $LEO_1$ to $LEO_n$, as indicated by communications links $12_1$ to $12_n$. The node spacecraft communicates with a ground station GS by means of a microwave communications link 14.

The microwave link 14 is of generally conventional design and its nature and operation will not therefore be described in detail.

Figure 2:
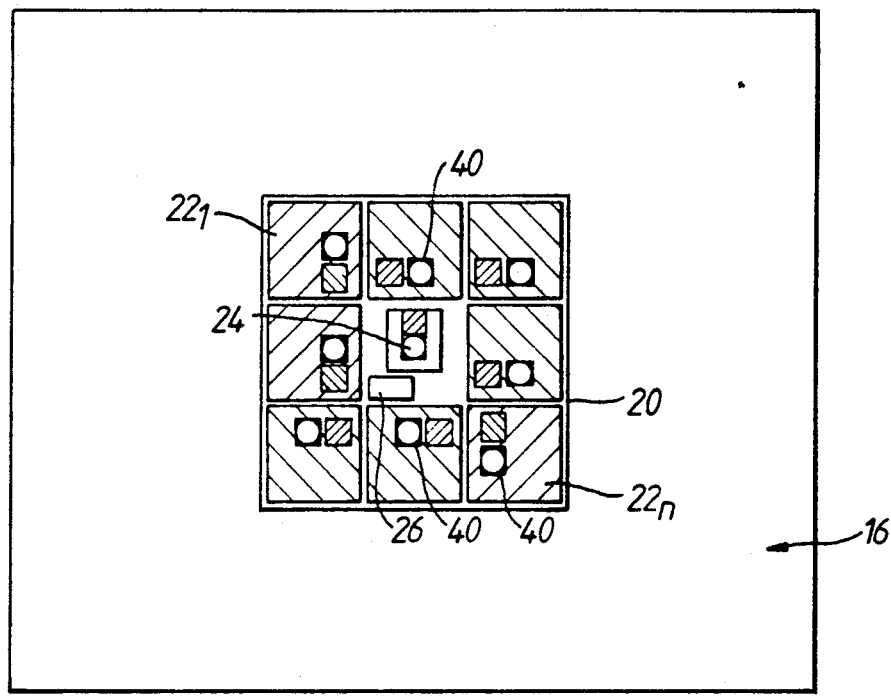
FIG. 2 is a view on a wall of the node spacecraft showing an optical bench supporting a beacon unit and eight terminal heads.
Figure 3:
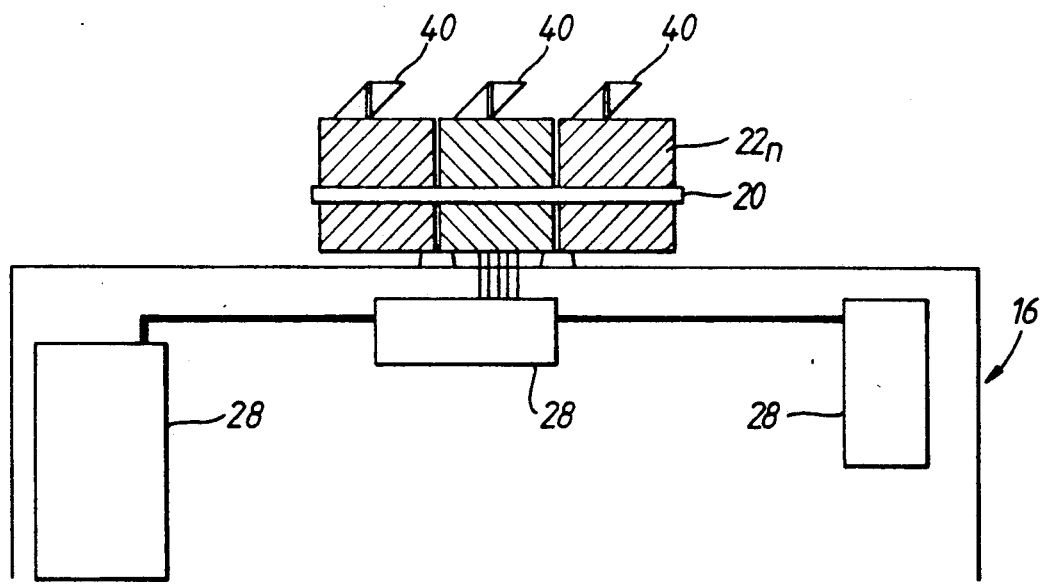
FIG. 3 is a side view on the arrangement of FIG. 2.
Figure 4:
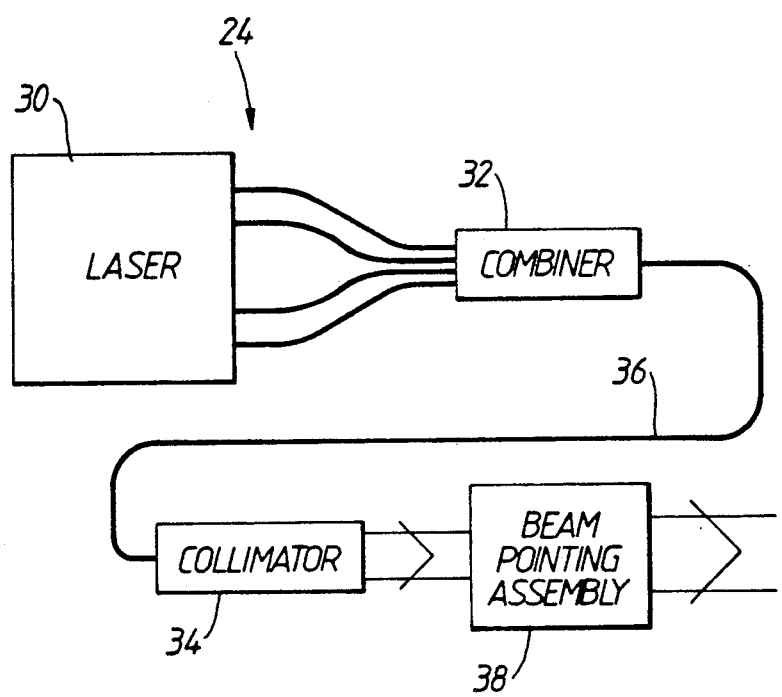
FIG. 4 is a schematic diagram illustrating the beacon unit used on the node spacecraft.

The node spacecraft GEO and the user spacecraft $LEO_1$ to $LEO_n$, are provided with complementary optical communications sets 16,$18_1$ to $18_n$ respectively. The optical communications set 16 provided on the node spacecraft GEO is illustrated in outline in FIGS. 2 and 3. The set 16 comprises an optical bench 20 which supports eight terminal heads $22_1$ to $22_n$ (one for each user spacecraft $LEO_1$ to $LEO_n$) arranged in a 3×3 rectangular array with a beacon unit 24 and a three-axis set 26 of inertial angular detection sensors secured to the optical bench 20 at the centre of the array. The optical bench 20 provides a rigid reference for the terminal heads and the beacon unit to make them substantially immune to any flexing experienced by the node spacecraft. Indeed, in one example, the optical bench is capable of limited damped movement with respect to the mode spacecraft. The electronics subsystems are distributed within the spacecraft as shown at 28. Referring to FIG. 4 the beacon unit 24 comprises a high power laser source unit 30 which supplies laser radiation to a combiner 32 which supplies the radiation to a collimator 34 in this example via a fibre optic link 36. The beam passes from the collimator to a two axis beam pointing assembly 38. It is preferred that only the collimator 34 and the beam pointing assembly be mounted on the optical bench 20.

Figure 5:
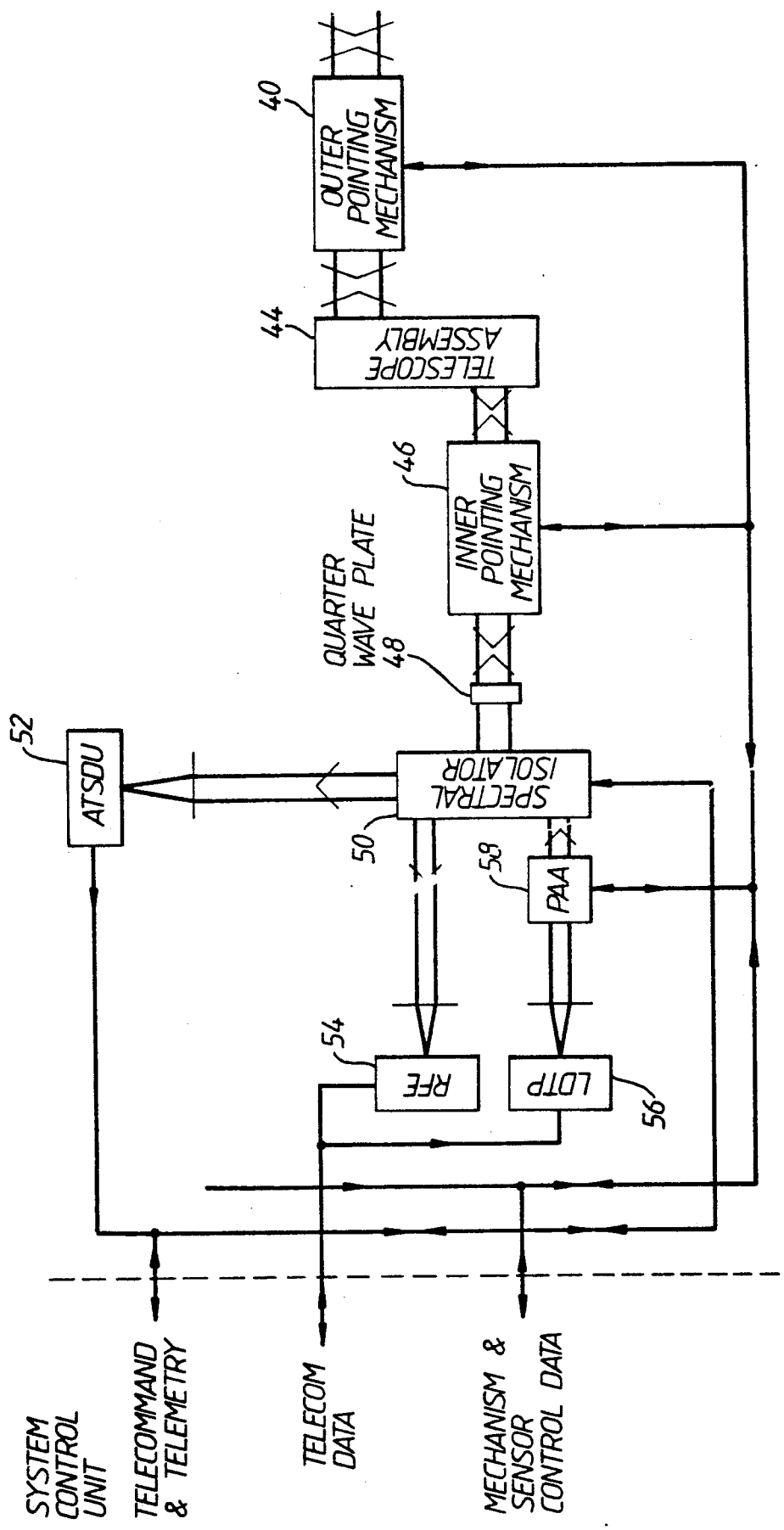
FIG. 5 is a schematic block diagram illustrating one of the terminal heads as used on the node spacecraft and each user spacecraft.

Referring now to FIG. 5 each node terminal head 22 is arranged to trasmit and receive an optical communications beam to and from a user terminal head. Each terminal head 22 includes an outer pointing mechanism 40 of periscope form capable of deflecting the beam passed thereby by ±10° about each of two axes. A beam entering the terminal head 22 via the outer pointing mechanism passes to a telescope assembly 44 thence to the inner pointing mechanism 46 which, due to the presence of the telescope assembly 44 has an effective angular range in this example of ±2° about two angular axes. From the inner pointing mechanism 46, an incoming beam passes via a quarter wave plate 48 to a spectral isolator 50. Here a small portion of the incoming beam is stripped off to pass to an acquisition and tracking sensor and drive unit (ATSDU) 52. The ATSDU 52 typically includes an acquisition sensor of relatively wide field of view and a tracking sensor of narrower field of view. Data from the acquisition sensor is processed during an acquisition phase to determine the direction of arrival of an incoming beam (a communications beam or an acquisition beam) to provide data for the system control unit to drive the outer pointing mechanism 40 in the direction of the incoming beam. Thereafter, data from the tracking sensor is used to control the inner pointing mechanism 46, and occasionally the outer pointing mechanism 40, to track movement of the incoming beam.

The remainder of an incoming beam passes from the spectral isolator 50 to a receiver front end unit 54 where the communications signal is demodulated and processed as required.

The transmission beam is generated at a laser diode package 56 whence it passes to a point ahead assembly 58. The point ahead assembly 58 deflects the transmit beam relative to the received beam by an amount to compensate relative movements of the two spacecraft during the time taken for the light to travel between the two spacecraft. This assembly is capable of deflecting the beam about two axes and may be of similar construction to the outer pointing mechanism 40 and the inner pointing mechanism 46. Control data for the point ahead assembly is supplied by the system control unit.

From the point ahead assembly 58, the transmission beam passes to the spectral isolator 50 thence to the telescope assembly 44 via the quarter wave plate 48 and the inner pointing mechanism 46. Thereafter the transmission beam passes through the outer pointing mechanism 40 to leave the terminal. It will be understood that the function of the inner and outer pointing mechanisms 46 and 40 is the same for both the incoming and transmission (outgoing) beams namely to align the terminal with the line of sight connecting the terminal to a remote terminal with which data is to be exchanged.

In practice, each terminal will of course have back up equipment where necessary; for simplicity such equipment has been omitted from the drawings.

Each user spacecraft $LEO_1$ to $LEO_n$ has a single terminal head 22 of the type illustrated in FIG. 5 controlled by a system control unit on board the spacecraft in accordance with data generated on board the spacecraft or provided from a remote spacecraft or ground station.

Figure 6:
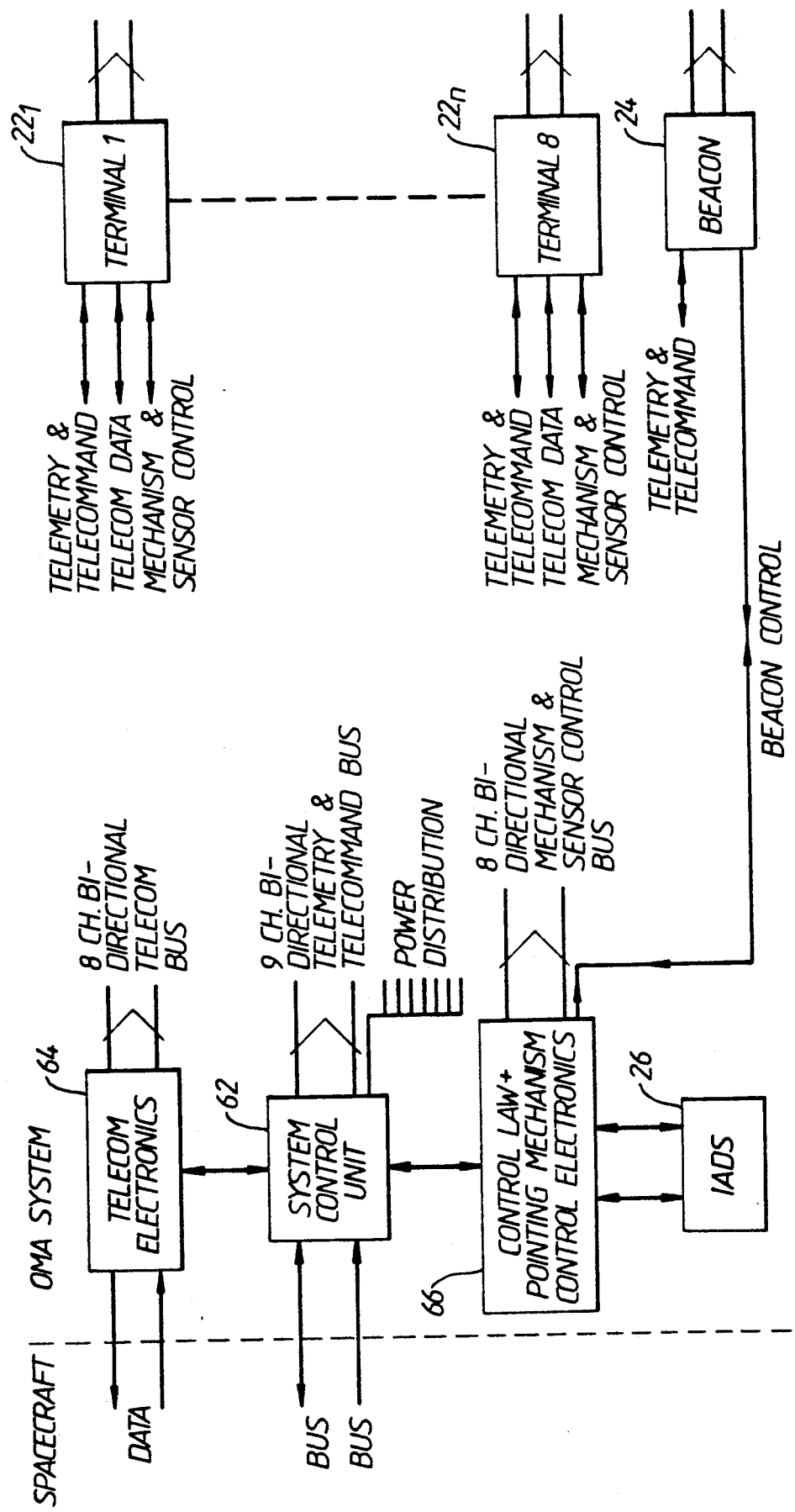
FIG. 6 is a functional system diagram illustrating the control system for controlling operation of the terminal heads and the beacon unit on the node spacecraft.

The node spacecraft GEO has one terminal head 22 of the type illustrated in FIG. 5 for each possible user spacecraft (in this example eight terminal heads), and a single beacon unit 24. The control system 60 for controlling the beacon unit 24 and the terminal heads 22 on board the node spacecraft GEO is illustrated in FIG. 6.

The system control unit 62 performs all telecommand operations, power supply conditioning and switching and assembly of the telemetry data. The unit 62 interfaces with the spacecraft data handling bus and power subsystems. The telecommunications electronics 64 interfaces with the inter-satellite feeder link and performs any coding, digital modulation and signal processing functions. The control law and pointing mechanisms electronics unit 66 performs all the necessary computation and control signal processing and generation for the pointing and tracking systems. Information on the node spacecraft position and attitude and on the user spacecraft location will be passed to the unit 66 via the system control unit 62. Point ahead look-up information will also be downloaded to the unit 66. Unit 66 will also calculate the required control signals for controlling pointing and scanning of the beacon beam emitted by the beacon unit 24. Sensor information from the inertial attitude detection system 26 and the acquisition and tracking sensor and drive unit 52 from each terminal head $22_1$ to $22_n$ is also received and processed by the control law and pointing mechanism control electronics unit 66.

Figure 7A:
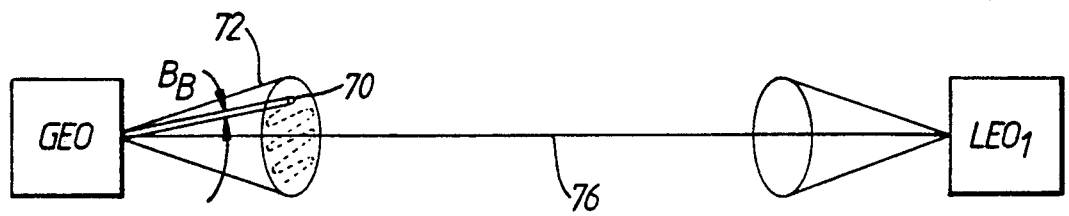
FIGS. 7a to 7d illustrate the acquisition sequence for establishing communication between the node spacecraft and the user spacecraft.

A typical acquisition sequence for establishing communication between the node spacecraft GEO and a selected user spacecraft $LEO_1$ will be described with reference to FIGS. 7a to 7d. Firstly, the information on the node spacecraft GEO attitude and position is determined (possibly from information determined or calculated at the ground station GS and supplied by the microwave communications link) and supplied to the control law and pointing mechanism control electronics unit 66, together with information concerning the selected user spacecraft which is gathered in a similar manner. The unit 66 then calculates the heading of the selected user spacecraft $LEO_1$ with respect to the node spacecraft GEO and determines the point ahead angle to be applied by the point ahead assembly 58 in the selected terminal head 22. The unit 66 also calculates a cone of uncertainty centred on the calculated heading, the angle of maximum deflection or the half angle of the cone (herein referred to as the extent of the scan pattern) being selected in accordance with the attitude uncertainty of the node spacecraft, so that if the beacon is scanned through the cone of uncertainty, it will illuminate the selected user at some point in the scan pattern. The unit 66 causes the beacon unit to direct a beacon beam 70 of beamwidth $B_B$ to follow a scan pattern in the cone of uncertainty 72 centred on the line of sight 76 between the node spacecraft and the user spacecraft. The unit 66 also causes the pointing mechanisms of the selected terminal head $22_1$ to follow the pattern of the beacon beam to watch for a return signal from the selected user spacecraft $LEO_1$, until such time as a return signal is received from the selected user spacecraft. This sequence is illustrated in FIG. 7a.

Figure 7B:
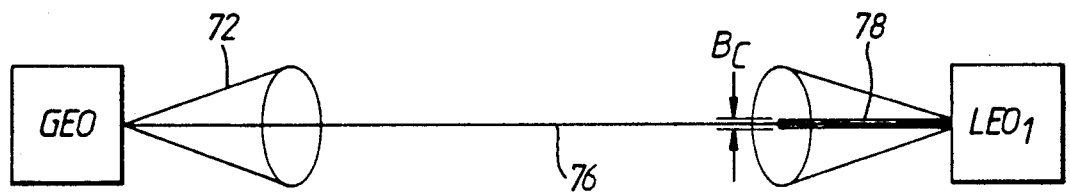

The sensor on the terminal head $22_1$ on the selected user spacecraft $LEO_1$ has a field of view at least as large as the uncertainty cone of the spacecraft and when the sensor detects the incidence of the beacon beam from the beacon 24 by means of the acquisition and tracking sensor and drive unit 52, the unit will track the detected signal and the control unit on the user spacecraft $LEO_1$ will cause the terminal head $22_1$ to point a communications beam 78 of beamwidth $B_C$ back up the line of sight 76 to the node spacecraft GEO. This is illustrated in FIG. 7b. ($B_C$ is much less than $B_B$).

Figure 7C:
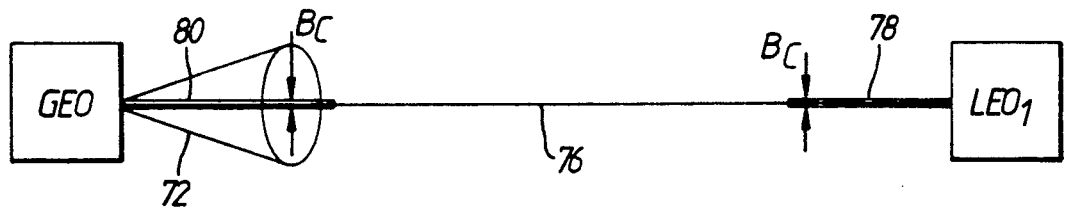

The incidence of the communications beam 78 on the terminal head $22_1$ readies the node spacecraft GEO. The node spacecraft then begins to track the communications beam 78 and switches on its narrow communications beam and directs it along the line of sight 76. The beacon beam is no longer required for this particular acquisition sequence. This is illustrated in FIG. 7c.

Figure 7D:
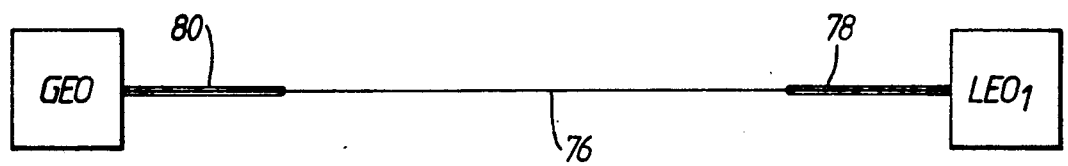

Finally, the communications beam from the node spacecraft GEO reaches the user spacecraft $LEO_1$ and the link is established (FIG. 7d). Relative movement of the spacecraft is detected by the acquisition and tracking sensor and drive units 52 in the terminal head 22, on the node spacecraft GEO and the terminal head 22 on the user spacecraft $LEO_1$ which effect any adjustments to the pointing mechanisms that are required to maintain the communications link.

The establishment of communication with subsequent user spacecraft follows the sequence described above except that the scan pattern is preferably modified as to be described below.

In this arrangement, it will be appreciated that the initial stage of the acquisition phase is achieved using a single beacon unit which may be pointed independently from each of the terminal heads. If conventional techniques were used, one beacon unit would be needed for each terminal unit and hence there is a weight saving of $N-1$ times the beacon weight where N is the number of user spacecraft. There will of course need to be an independent pointing mechanism for the beacon, but this will weigh considerably less than $N-1$ times the beacon weight and so the present arrangement provides a considerable reduction in overall weight of the optical communications system.

One consequence of employing a single beacon is that, if several user spacecraft need to be acquired in the same period, it will be necessary to perform the acquisition phases sequentially rather than in parallel. Thus, any reduction in acquisition time represents a significant benefit.

The illustrated communication system is configured to implement a method which considerably reduces the acquisition time for acquiring second and subsequent user spacecraft. In essence this reduction is achieved by reducing the extent of the uncertainty cone associated with the node spacecraft so that the scanning time is reduced.

Before any links have been acquired, the positions of the node spacecraft and the user spacecraft may be determined with a sufficient degree of accuracy, for example from data supported by the ground station GS. However, the attitudes of the various spacecraft at these positions are not known with a sufficiently high degree of accuracy (i.e. having regard to the beam width of the optical communications beams to be passed between the spacecraft and the separation of the spacecraft). If an orthogonal set of coordinate axes X, Y and Z is defined with the Z axis pointing down the line of sight, then the attitude error may be resolved into translations along the X and Y axes and a rotation about the Z axis. The control law and pointing mechanism control electronics unit 66 stores data representing the half angle of the cone of uncertainty and, possibly, its disposition relative to the node spacecraft. When the first user spacecraft $LEO_1$ has been acquired this provides an attitude "fix" which is used by the control law and pointing mechanism control electronics unit 66 to refine the cone of uncertainty to reduce its angular extent. Data representing the revised cone of uncertainty is stored by the unit 66. In effect, by acquiring the first user the error in the X and Y axes discussed above is much reduced but the rotation error about Z is not known. It will be appreciated that this refinement occurs because once the first acquisition has been made, the system has, in addition to accurate data representing the positions of the spacecraft relative to earth, a very accurate reading of the heading of the user spacecraft relative to the node spacecraft.

The reduction in the cone of uncertainty means that the time taken for the beacon to sweep through the uncertainty cone is reduced. In a typical example, the time for the first acquisition would be 30 seconds and that for the second 10 seconds. (These values are on the basis that the tracking routine disclosed in our earlier European Patent Application No. 88311009.0 is employed). In effect, the cone of uncertainty that needs to be scanned in the second acquisition is reduced to that needed to cover "rotational" error about the axis of the previous acquisition sequence.

Once the second user has been acquired however, this rotational error can be resolved as the relative orientation of the lines of sight connecting the mode spacecraft to the first and second user spacecraft is known. The required scan for the acquisition of the third (and subsequent) user spacecraft need now only be that the error angle induced by computational calculations, and mechanical tolerances of the equipment. In some applications the area to be covered may well be within the beam width of the beacon beams so that no scanning is necessary. It must be understood that as long as the node spacecraft is optically linked to two user spacecraft whose positions are known, the attitude of the optical bench (and thus all the terminal heads and the beacon view associated therewith) may be calculated absolutely, subject to errors due to computational calculations and mechanical tolerances.

Examples of appropriate structures for the outer pointing, point ahead and inner pointing mechanisms 40, 58 and 46 are described in the article "Pointing, Acquisition and Tracking for Intersatellite Optical data links" by W. Auer in the Proc. ESA Workshop on Space Laser Applications and Technology, Les Diablerets, 26-30 Mar. 1984 (ESA SP-202, May 1984) pages 131-137, the content of which is incorporated herein by reference.

We claim:

1. A communications system comprising:
    a plurality of user stations each having a transmit/receive terminal; and
    a node station, said node station including:
        an optically rigid platform;
        a plurality of transmit/receive terminals supported by said platform;
        means for mounting said platform on said node station and for substantially vibrationally isolating said platform from said node station; and
        beacon means for generating a beam and for initiating respective acquisition phases for establishing communication between respective given transmit/receive terminal on said node stations and a transmit/receive terminal on at least one of said user stations.

2. A communications system according to claim 1, wherein each of said user and node stations is a spacecraft and each of said transmit/receive terminals is operable to pass an optical communications beam of relatively narrow beamwidth and said beacon means generates an optical acquisition beam of relatively broad beamwidth.

3. A communications system according to claim 1, wherein each of said transmit/receive terminals has associated therewith acquisition and tracking means for acquiring and tracking a beam incident on the user station associated with said acquisition and tracking means.

4. A communications system according to claim 1, wherein said transmit/receive terminals on said node station have inlet and outlet means and said beacon means has an outlet means wherein said node station platform includes:
    a rigid support for at least the inlet and outlet means of each of said transmit/receive terminals and at least the outlet means of said beacon means, and
    an attitude sensor means, associated with said platform, for detecting the angular position thereof.

5. A communications system according to claim 4, wherein said beacon means includes a laser source located remote from said platform and fibre optic means for supplying laser radiation to said beacon outlet means located on said platform.

6. A communications system according to claim 1, further including:
    means for storing data representing an estimate of attitude of said platform and data representing any attitude uncertainty;
    means for establishing an optical link between a transmit/receive terminal on said platform and a transmit/receive terminal on a selected user station; and
    means for determining the orientation of said optical link with respect to said platform and for refining said estimate of attitude of said platform and reducing any attitude uncertainty.

7. A communications system for communicating between a node station and a plurality of user stations, said system comprising:
    a plurality of steerable node transmit/receive terminals optically rigid with respect to each other at said node station for transmitting or receiving a relatively narrow communications beam to or from a respective user station;
    a steerable beacon means at said node station for emitting a relatively broad acquisition beam to illuminate any one of said user stations;
    acquistion control means operable during an acquisition phase for controlling said beacon means and one of said node transmit/receive terminals to follow related scan patterns; and
    a steerable user transmit/receive terminal provided at each user station for transmitting or receiving a relatively narrow communications beam to or transmit/receive terminal at said node station, and each of said user transmit/receive terminals being responsive to illumination by said beacon means to transmit a communications beam to said node station.

8. A method of communicating between a node station which includes a plurality of steerable node transmit/receive terminals optically rigid with respect to each other and two or more user stations each of which includes a steerable user transmit/receive terminal for communicating with a respective node transmit/receive terminal via a relatively narrow communications beam, which method comprises illuminating a first user station with a relatively broad acquisition beam emitted from said node station, causing the user transmit/receive terminal on said first user station to transmit a communications beam to one of said node transmit/receive terminals; illuminating a second user station with said acquisition beam and causing the user transmit/receive terminal on said second user station to transmit a communications beam to said node station.

9. In a system including a node station and at least two user stations, wherein the relative positions of the node station and user stations are determined and wherein the angular attitude of the node station relative to a reference frame estimated subject to an uncertainty factor, a method of establishing communications between said node station and each of said user stations, which comprises causing an acquisition beam associated with said node station to follow a first scan pattern about an axis connecting said node station with one of said user stations, the pattern being of extent dependent on said uncertainty factor, causing said one user station to transmit a beam back to said node station whereby the estimate of the angular attitude of the node station is refined, and thereafter causing said acquisition beam to follow a second scan pattern about an axis connecting said node station with a second of said user stations, the pattern being of correspondingly reduced extent.

10. A method according to claim 9, wherein said second user station is caused to transmit a beam back to said node station whereby the angular estimate of the attitude of the node station is further refined, and thereafter said acquisition beam is caused to follow a third scan pattern on or about an axis connecting said node station with a third of said user stations, the pattern being of correspondingly further reduced extent.

11. A method of directing a beam from a node station towards one of a plurality of user stations, which comprises the steps of:
 (1) determining the relative position of a first user station with respect to said node station,
 (2) establishing a communications link generally coincident with the line of sight connecting said node station and said first user station,
 (3) determining an estimate of the angular attitude of at least a portion of said node station based on the orientation of said line of sight with respect thereto,
 (4) determining the relative position of a second user station, and
 (5) processing data representing the relative positions of said node station and said second user station to determine an estimate of the orientation with respect to the node station of the line of sight connecting said node station and said second user station.

* * * * *